United States Patent
Xanthos et al.

(10) Patent No.: US 6,211,275 B1
(45) Date of Patent: Apr. 3, 2001

(54) WOOD SUBSTITUTE COMPOSITION AND PROCESS FOR PRODUCING SAME

(75) Inventors: Marino Xanthos, Fort Lee; Subir K. Dey, Bridgewater, both of NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 09/190,041

(22) Filed: Nov. 10, 1998

(51) Int. Cl.⁷ ........................................... C08K 3/26
(52) U.S. Cl. ............................................. 524/426
(58) Field of Search ..................... 524/425, 426, 524/427

(56) References Cited

U.S. PATENT DOCUMENTS

| | | | |
|---|---|---|---|
| 4,379,190 | * | 4/1983 | Schenck ................... 428/95 |
| 4,734,450 | * | 3/1988 | Kawai ..................... 524/413 |
| 4,845,145 | * | 7/1989 | Hazelton ................. 524/426 |
| 5,086,109 | * | 2/1992 | Ueno ...................... 524/496 |
| 5,100,947 | * | 3/1992 | Puydak .................... 524/423 |
| 5,457,197 | | 10/1995 | Sifniades et al. . |
| 5,535,945 | | 7/1996 | Sferrazza et al. . |
| 5,635,551 | | 6/1997 | Lee . |
| 5,656,757 | | 8/1997 | Jenczewski et al. . |
| 5,681,952 | | 10/1997 | Sifniades et al. . |
| 5,719,198 | | 2/1998 | Young et al. . |

FOREIGN PATENT DOCUMENTS

WO98/06778  2/1998  (WO) .

OTHER PUBLICATIONS

Levy et al., 1997, presented at ARC '97 on Nov. 7, 1997.
Database WPI, & JP 07 052222 A, Feb. 28, 1995.

* cited by examiner

*Primary Examiner*—Paul R. Michl
(74) *Attorney, Agent, or Firm*—Klauber & Jackson (57) ABSTRACT

Provided herein is a wood substitute composition that utilizes in its production heretofore unused waste material produced in the reclamation of nylon from discarded carpet, along with processes for produced the wood substitute composition. The wood substitute composition shares similar properties to wood, and hence has numerous applications in the building and construction industries.

41 Claims, 4 Drawing Sheets

WOOD SUBSTITUTE COMPOSITION AND PROCESS FOR PRODUCING SAME

FIELD OF THE INVENTION

Broadly, the present invention relates to a composition that can serve as a wood substitute in numerous applications where wood is used, and methods of producing a wood substitute using discarded materials.

BACKGROUND OF THE INVENTION

Figure 1:
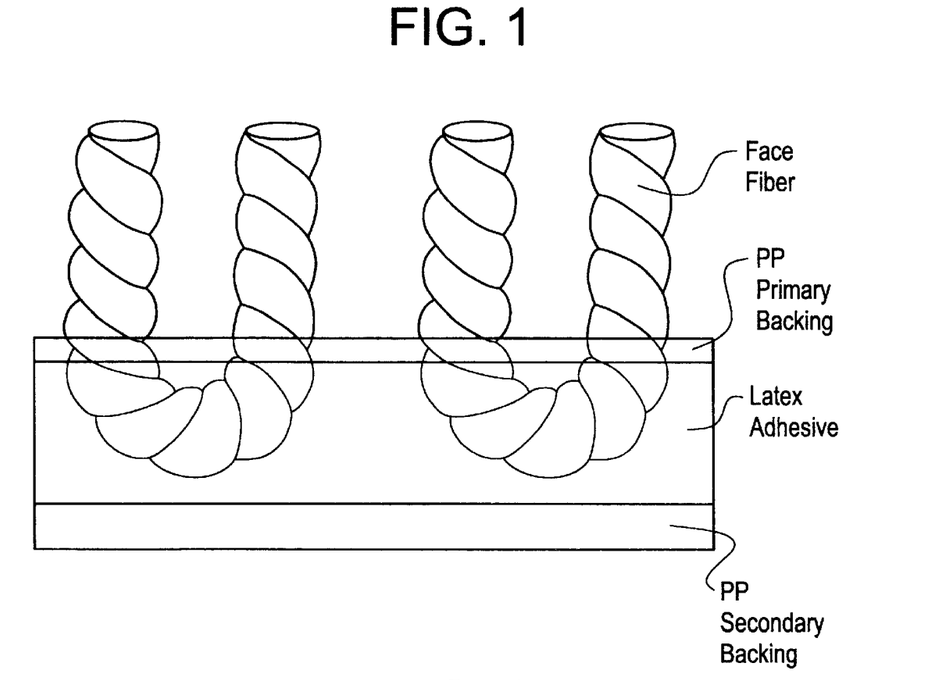
FIG. 1 is a cross sectional drawing of the construction of a typical broadloom carpet.

Presently, carpet is used routinely in residential, commercial, industrial, and automobile settings. Although many types of styles and colors are available, the face fibers of carpets produced in North America are predominantly comprised of nylon 6, produced by Allied-Signal Corporation, or nylon 6,6 produced by Solutia Corporation. In addition to the face fiber, which is about 50% by weight of a carpet, a typical broadloom carpet also contains about 10% by weight polypropylene primary and secondary backings, about 9% by weight styrene-butadiene rubber (SBR) latex adhesive, and about 35% by weight calcium carbonate as filler. The construction of a typical broadloom carpet involves weaving the face fiber through the primary polypropylene backing forming a "U" shaped fiber such that the ends of the face fiber form the pile of the carpet, i.e., the surface of the carpet, and the base of the "U" shaped fiber is located beneath the primary polypropylene backing. A layer of a composition comprising the SBR latex adhesive and calcium carbonate filler is then applied to the surface of the primary polypropylene backing opposite of the pile such that the base of the "U" shaped fiber is embedded in the composition. A secondary backing made of polypropylene is then adhered to the layer comprising SBR latex adhesive and calcium carbonate opposite to the pile. A schematical cross sectional view of a typical broadloom carpet is set forth in FIG. 1.

In order to produce the huge amounts of carpet consumed by the construction industry, and to replace worn carpet, billions of pounds of fibers are produced. For example, in 1995, Canada and the United States produced 3.1 billion pounds of fiber for carpets. With these fibers, approximately 6.4 billion pounds of carpet were produced, of which about 70% was used to replace worn carpet. In order to decrease the amount of landfill volume used by disposed carpet, and to recycle valuable components of carpet, such as the face fibers, efforts have been made to isolate and depolymerize nylon 6 face fibers from carpet. A particular example of such a method is set forth in U.S. Pat. No. 5,457,197 (the '197 patent) and U.S. Pat. No. 5,681,952 (the '952 patent), both of which are hereby incorporated by the reference herein in their entireties. The '197 patent discloses a process for recovering monomer from a multi-component polymeric waste material, such as carpet, that includes at least one hydrolyzable polymeric component, e.g., the nylon 6 pile. As a result of the processes set forth in these patents, nylon 6 fibers can be removed from a multicomponent carpet and depolymerized to form caprolactam, while the remaining components of the carpet form a calcium carbonate and thermoplastic resin blend referred to as "Q compound". Q compound is a black, brittle solid made up of non-nylon 6 components of carpet produced with the processes of the '197 and '952 patents. In particular, Q compound comprises by weight about 63–65% calcium carbonate, about 15–18% polypropylene, and about 12–15% styrene butadiene rubber. Since carpets processed pursuant to the teachings of the '197 and '952 patents are generally constructed in the same manner with the same materials, the Q compound produced using these processes generally has the same composition and physical properties. Table 1 sets forth ranges and averages of the calorific value, and amounts of sulfur and chloride found in Q compound.

TABLE 1

Range and Average Parameters regarding properties of Q Compound

| Parameter | Measuring Method | Range | Average |
| --- | --- | --- | --- |
| BTU/lb | ASTM D-2015-85 | 6660–6914 | 6818 |
| % Sulfur | ASTM D-3177 | 0.19–0.30 | 0.24 |
| % Chloride | ASTM C-114 | 0.05–0.09 | 0.07 |

Furthermore, a Material Safety Data Sheet describing the properties of Q compound is incorporated by reference herein, and attached hereto as "Appendix A".

Since tons of nylon 6 are being reclaimed and recycled every year, tons of Q compound are being produced with no apparent use. Accordingly, what is needed is a use for Q compound so that all the components of discarded carpet can be recycled, thus alleviating the strain on available landfills.

The citation of any reference herein should not be construed as an admission that such reference is available as "Prior Art" to the instant application.

SUMMARY OF THE INVENTION

There is provided, in accordance with the present invention, a composition that can serve as a wood substitute, wherein processes for forming the composition utilize Q compound produced in the reclamation of nylon 6 from discarded carpet. A composition of the present invention has numerous applications in the construction industry, including, but not limited to thermal spacers in metal studs used in framing structures.

Broadly, the present invention extends to a wood substitute composition comprising a polyolefin and a composition comprising calcium carbonate, polypropylene, and styrene butadiene rubber. The amount by weight of polyolefin in the wood substitute composition can vary from about 10% to about 90% by weight, depending upon the desired molding properties of the wood substitute composition. Likewise, the amount of the composition described above included within the wood substitute composition can vary from about 10% to about 90% by weight. The greater the quantity of polyolefin included in a wood substitute composition of the invention, the less rigid the wood substitute composition becomes, and the easier it is for a skilled artisan to mold the wood substitute composition. Also, increasing the amount of the composition set forth above in the wood substitute composition of the invention results in increasing the rigidity of the wood substitute composition. Hence a skilled artisan can readily produce a wood substitute composition of the invention having properties needed for a particular application. In a particular embodiment of the invention, a wood substitute composition comprises by weight about 20% polyolefin, and about 80% of the composition set forth above.

Furthermore, the present invention extends to a wood substitute as explained above, wherein the polyolefin and the composition comprising calcium carbonate, polypropylene, and styrene butadiene rubber are mixed and heated to a sufficient temperature for a sufficient length of time to form a fluid. This fluid is then optionally molded and then cooled in order to form a solid, which is a wood substitute composition of the invention. Numerous temperatures can serve as a sufficient temperature for purposes of producing a wood substitute composition of the invention. For example, a temperature sufficient to form a fluid as described above can range from about 100° to about 230° C., depending upon the amount of polyolefin and composition in the wood substitute composition. In a particular embodiment of the invention, the polyolefin comprises low density polyethylene (LDPE) which is 20% by weight of the wood substitute composition, and the composition described above comprises about 80% by weight. A sufficient temperature to form a fluid for this mixture is about 225° C.

Furthermore, as explained above, a mixture of the composition described above and the polyolefin must be heated for a sufficient length of time in order to form a fluid. Naturally, the sufficient length of time depends upon the temperature to which the mixture is heated. Hence, the sufficient period of time can range from about 3 minutes to about 10 minutes. In a particular embodiment, wherein the polyolefin is LDPE and comprises about 20% by weight of the wood substitute composition, and the composition comprises about 80% by weight. The polyolefin and composition are mixed and heated to about 225° C. for about 5 minutes. Moreover, heating and mixing of the polyolefin and the composition can occur simultaneously.

In addition, numerous polyolefins can be successfully used in a wood substitute composition of the invention. Examples of polyolefins having applications herein include, but are not limited to polyethylene, polypropylene, polybutene, polymethylpentene, copolymers of polyolefins such as copolymers of polyethylene, polypropylene, polybutene and combinations of copolymers of polyolefins with another molecule, wherein such combinations include, but are not limited to copolymers of ethylene with acrylic esters such as vinyl acetate, ethyl acrylate and methyl acrylate; copolymers of ethylene or propylene with unsaturated acids and anhydrides like acrylic acid, methacrylacrylic acid, maleic anhydride; or copolymers of polyolefins with styrene and their maleic anhydride versions.

Furthermore, Q compound produced from a nylon 6 reclamation process set forth in various patents described above, and incorporated by reference herein, can be used as the composition comprising calcium carbonate, polypropylene, and styrene butadiene rubber. The physical and chemical properties of Q compound, which are described above in Table 1 and in the MSDS sheet attached hereto as "Appendix A" are substantially uniform regardless of the carpet used in its production. Hence, one of ordinary skill in the art can use any lot or batch of Q compound produced in order to produce a wood substitute composition of the invention.

Naturally, the present invention extends to a wood substitute composition as described above comprising a polyolefin and Q compound. Furthermore, the percentages by weight of polyolefin and Q compound contained with a wood substitute composition of the invention can vary, depending upon the desired physical properties of the wood substitute composition. In particular, the percentage by weight of polyolefin in a wood substitute composition of the invention can range from about 10% to about 90%, and the percentage by weight of Q Compound in a wood substitute composition of the invention can range from ranges from about 10% to about 90%. As explained above, the greater the amount of polyolefin added to the wood substitute composition, the more ductile and shapable the wood substitute composition becomes. In contrast, the greater the amount of Q compound added, the greater the rigidity of the wood substitute composition. In a particular embodiment of the invention, the wood substitute comprises about 80% by weight Q compound, and about 20% by weight polyolefin.

Furthermore, numerous polyolefins can be successfully used in a wood substitute composition of the invention. Examples of polyolefins having applications herein include, but are not limited to polyethylene, polypropylene, polybutene, polymethylpentene; copolymers of polyolefins such as copolymers of polyethylene, polypropylene, polybutene and combinations such as copolymers of ethylene with acrylic esters such as vinyl acetate, ethyl acrylate and methyl acrylate; copolymers of ethylene or propylene with unsaturated acids and anhydrides like acrylic acid, methacrylacrylic acid, maleic anhydride; or copolymers of polyolefins with styrene and their maleic anhydride versions. In a particular embodiment, the polyolefin used in the wood substitute composition comprises low density polyethylene.

Furthermore, in order to produce a wood substitute composition with Q compound and low density polyethylene, the Q compound and low density polyethylene must be mixed and heated to a sufficient temperature for a sufficient length of time in order to form a fluid. This fluid is then optionally molded, and cooled in order to form a wood substitute composition of the invention. Generally, the mixture is heated to a temperature ranging from about 100° C. to about 230° C., depending upon the amounts of polyolefin and Q compound in the mixture. In the situation where the Q compound comprises about 80% by weight, and the polyolefin is a low density polyethylene comprising about 20% by weight of the wood substitute composition, a sufficient temperature is about 225° C.

Naturally, the length of time needed to form a fluid as described above, depends upon the temperature to which the mixture of Q compound and the polyolefin used. Generally, a sufficient length of time for heating the mixture ranges from about 3 minutes to about 10 minutes. In a situation wherein the wood substitute composition comprises by weight 80% Q compound and 20% low density polyethylene, and wherein this mixture is heated to about 225° C., a sufficient length of time to form a fluid is about 5 minutes.

Figure 3:
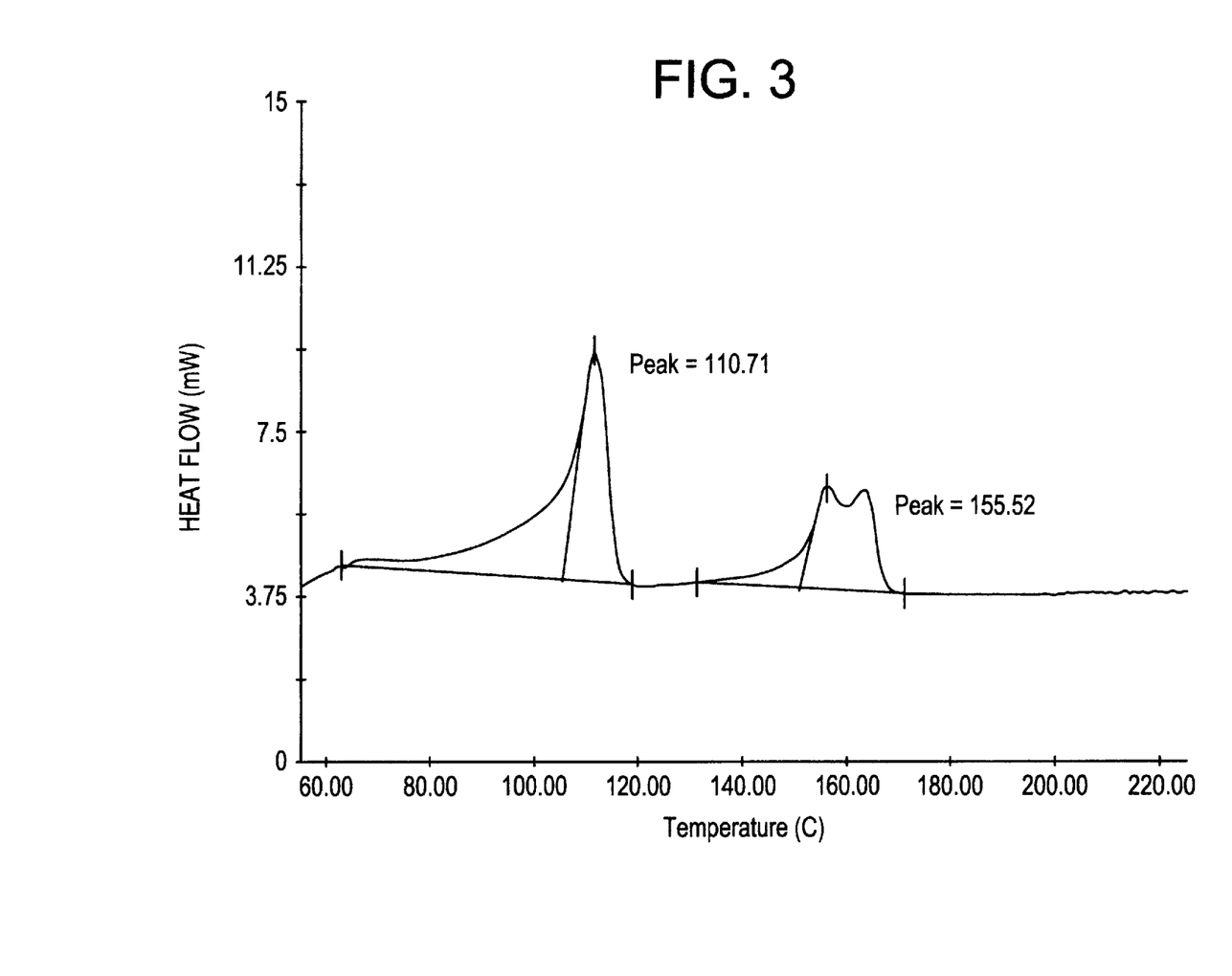
FIG. 3 is a graph of the melting point range of a wood substitute composition of the invention comprising about 80% by weight Q compound and about 20% by weight low density polyethylene. The melting point range comprises 3 peaks, one at 110.7° C., one at 155.5° C., and one at about 164° C.
Figure 4:
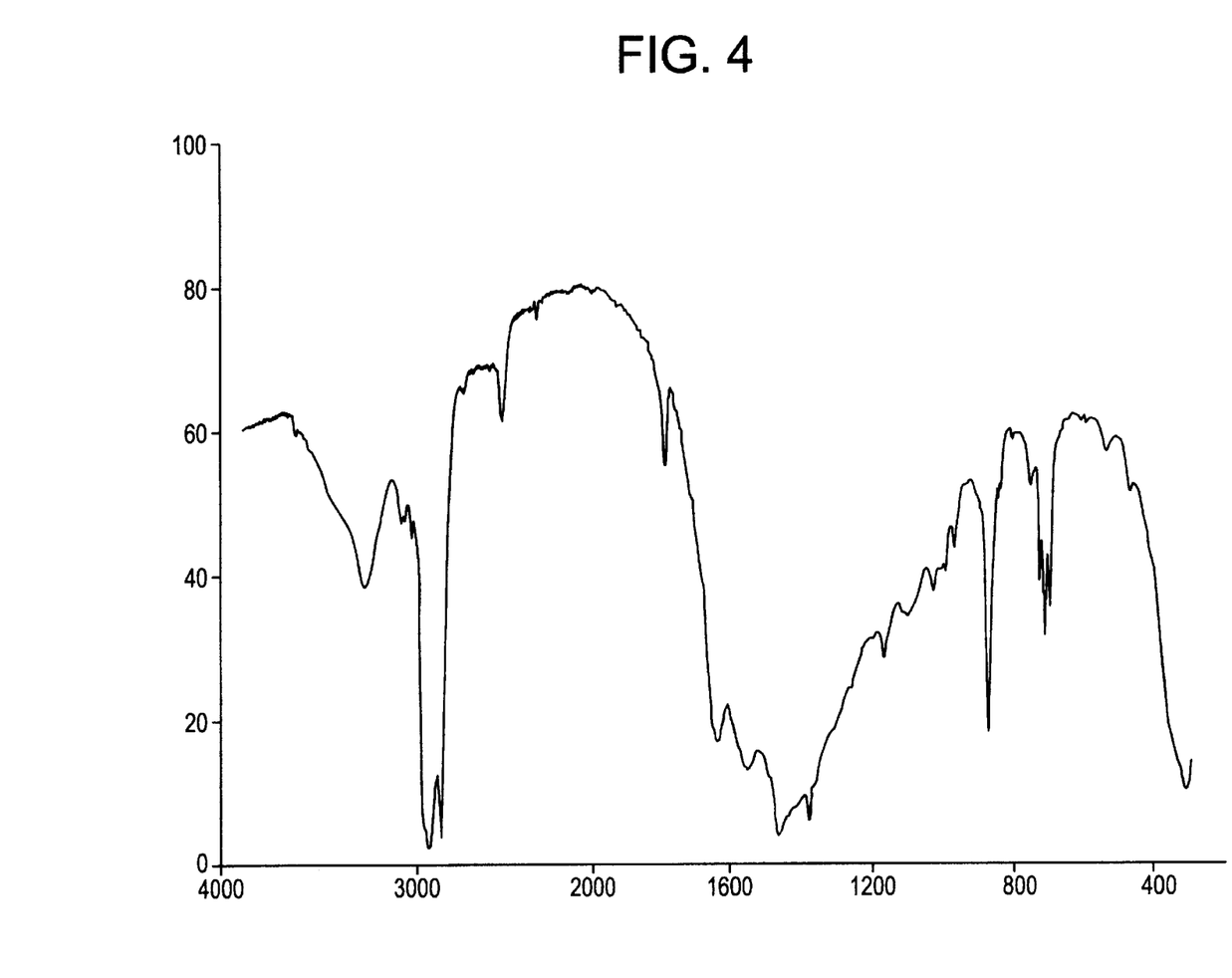
FIG. 4 is the infra red spectrum of a wood substitute composition comprising by weight about 80% Q compound and about 20% LDPE.

In a particular embodiment of the invention, a wood substitute composition comprises by weight about 80% Q compound and about 20% low density polyethylene, which are mixed together and heated to about 225° C. for about 5 minutes, and then allowed to cool, forming a wood substitute composition:

comprising a density of 1.35–1.4 g/cm$^3$;

comprising a thermal conductivity of 2.92×10$^{-4}$ cal/(s.cm.K);

comprising a flame propagation of about 0.52 cm/min;

is partially soluble in boiling xylene at 1 atmosphere pressure;

is relatively insoluble in water;

comprising a melting point range as set forth in FIG. 3, wherein the melting point range comprises a peak at 110.7° C., a peak at 155.5° C., and a peak at about 164° C.; and has an infra red spectrum substantially as shown in FIG. 4.

Furthermore, the present invention extends to a process for producing a wood substitute composition comprising the steps of:

i) mixing a polyolefin with a composition comprising:
   a) calcium carbonate;
   b) polypropylene; and
   c) styrene butadiene rubber
   to form a mixture;
ii) heating the mixture to a sufficient temperature for a sufficient length of time to form a fluid; and
iii) cooling the fluid to form a solid.

In the process of the invention, the quantities of polyolefin and composition used can vary, depending upon the desired properties of the wood substitute composition. In particular, the greater the amount of polyolefin added to the wood substitute composition, the more ductile the wood substitute becomes. In contrast, the greater the amount of composition added, the more rigid the wood substitute composition becomes. Hence, the amount of polyolefin used in a wood substitute composition of the invention can range from about 10% to about 90% by weight, and the amount of composition in a wood substitute composition of the invention can range from about 10% to about 90% by weight. In a particular embodiment of the invention, the wood substitute composition comprises about 20% by weight polyolefin and about 80% by weight the composition described above.

Moreover, Numerous polyolefins can be used in the process described above. Examples of polyolefins which can be used include polyethylene, polypropylene, polybutene, and polymethypentene. Furthermore, examples of copolymers of polyolefins having applications herein include copolymers of polyethylene, copolymers of polypropylene, copolymers of polybutene, and copolymers of polymethylpentene. Also, combinations of a polyolefin and another molecule include copolymers of ethylene with acrylic esters selected from the group consisting of vinyl acetate, ethyl acrylate, and methyl acrylate; copolymers of ethylene or propylene with unsaturated acids and anhydrides such as acrylic acid, acrylic anhydride, methacrylic acid, methacrylic anhydride and maleic anhydride; and copolymers of polyolefins with styrene. In a particular embodiment, the polyolefin used in a wood substitute composition of the invention comprises low density polyethylene.

Furthermore, in a particular embodiment of the invention, the composition comprising calcium carbonate, polypropylene, and styrene butadiene rubber is Q compound.

In addition, the present invention extends to a process for producing a wood substitute composition as set forth above, wherein the sufficient temperature to heat the mixture can vary from about 100° C. to about 230° C., depending upon the amounts of polyolefin and composition within the wood substitute composition. In a particular embodiment, wherein the wood substitute composition comprises about 20% by weight polyolefin, such as low density polyethylene, and about 80% by weight composition, such as Q compound, a sufficient temperature for forming a fluid is about 225° C.

Furthermore, the present invention extends to a process for producing a wood substitute composition as described above, wherein the sufficient length of time for heating the mixture to form a fluid can vary from about 3 minutes to about 10 minutes, depending upon the amount of polyolefin, and composition, such as Q compound, in the mixture, and the temperature to which the mixture is heated. In a particular embodiment, wherein the mixture comprises about 20% by weight polyolefin, such as low density polyethylene, and about 80% by weight Q compound, and the mixture is heated to about 225°, the sufficient length of time for heating the mixture to form a fluid is about 5 minutes. One of ordinary skill in the art can readily determine a sufficient temperature to heat the mixture, and sufficient length of time to heat the mixture, regardless of the proportions of polyolefin and Q compound, by merely watching the mixture to ensure a fluid forms.

Naturally, the present invention extends to a process for producing a wood substitute composition comprising the steps of:

i) mixing a polyolefin with a composition comprising:
   a) calcium carbonate;
   b) polypropylene; and
   c) styrene butadiene rubber
   to form a mixture;
ii) heating the mixture to a sufficient temperature for a sufficient length of time to form a fluid: and
iii) cooling the fluid to form a solid, wherein the mixing and heating steps can optionally be done simultaneously.

Furthermore, the present invention extends to a process as described above for producing a wood substitute composition, wherein the mixture comprises about 20% by weight a polyolefin, such as low density polyethylene, and about 80% by weight Q compound, such that the mixture is heated for about 5 minutes at about 225° C., and then cooling the fluid to form a wood substitute composition, wherein the wood substitute composition:

comprises a density of 1.35–1.4 $g/cm^3$;

comprises a thermal conductivity of $2.92 \times 10^{-4}$ cal/(s.cm.K);

comprises a flame propagation of about 0.52 cm/min;

is partially soluble in boiling xylene at 1 atmosphere pressure;

is relatively insoluble in water;

comprises a melting point range as set forth in FIG. 3, wherein the melting point range comprises a peak at 110.7° C., a peak at 155.5° C., and a peak at about 164° C.; and comprises an infra red spectrum substantially as shown in FIG. 4.

Accordingly, a principal object of the present invention is to provide a wood substitute composition which has numerous applications in the construction field, particularly as thermal spacers in plastic webbed steel studs. Unlike wood, a wood substitute composition of the invention neither rots nor warps due to exposure to varying temperatures and levels of humidity.

Another object of the invention is to utilize the tons of Q compound produced in the reclamation nylon 6 carpet which heretofore have had no use. Hence, various environmental concerns involved in the disposal of discarded carpet, such as limited landfill volume, can be ameliorated.

Another object of the present invention is to provide a wood substitute composition which can readily be used in place of wood, thereby conserving the quantities of wood harvested, and preserving timberland.

Yet another object of the invention is to provide a wood substitute composition which can have varying physical properties, so that one of ordinary skill in the art can tailor the wood substitute composition to have the physical properties needed for a particular application.

These and other objects of the present invention will be better appreciated by reference to the following drawings and Detailed Description.

DETAILED DESCRIPTION OF THE INVENTION

As explained above the present invention broadly extends to a wood substitute composition comprising a polyolefin and a composition comprising:

a) calcium carbonate;
b) polypropylene; and
c) styrene butadiene rubber.

Furthermore, the present invention broadly extends to a process for producing a wood substitute composition of the invention, wherein the process comprises the steps of:

i) mixing a polyolefin with a composition comprising:
  a) calcium carbonate;
  b) polypropylene; and
  c) styrene butadiene rubber
  to form a mixture;
ii) heating the mixture to a sufficient temperature for a sufficient length of time to form a fluid; and
iii) cooling the fluid to form a solid, wherein optionally, the mixing and heating steps can be performed simultaneously.

Although the composition comprising calcium carbonate, polypropylene and styrene butadiene rubber can be readily synthesized by one of ordinary skill in the art, it is much more economical to utilize the Q compound produced in the reclamation of nylon 6 from discarded carpet using the processes set forth in U.S. Pat. No. 5,457,197 (the '197 patent) and U.S. Pat. No. 5,681,952 (the '952 patent), both of which are hereby incorporated by the reference herein in their entireties. Although carpet is treated in a variety of ways and subjected to numerous cleaning solutions, dirt, etc. during its useful life, the properties of Q compound remain substantially uniform. A description of the physical properties of Q compound are set forth in Table 1, and in the Material Safety Data Sheet on Q compound which is incorporated by reference herein, and attached hereto as Appendix A. Hence, one of ordinary skill in the art can readily use Q compound in the wood substitute composition and in processes for producing the wood substitute composition of the invention without concern that the properties of Q compound will change substantially over time.

Furthermore, as used herein, the term "polyolefin" refers compositions such as polyethylene, polypropylene, polybutene, polymethylpentene; copolymers of polyolefins; and combinations of copolymers of polyolefins with additional compounds. Particular examples of copolymers of polyolefins referred to herein include copolymers of polyethylene, polypropylene, polybutene, and polymethylpentene; and combinations have applications herein include copolymers of ethylene or propylene with unsaturated acids and anhydrides, like acrylic acid, methacrylic acid and maleic anhydride, and copolymers of polyolefins with styrene and their maleic anhydride versions.

Moreover, as used herein, the phrase "partially soluble" in describing the solubility of a composition in a solvent refers to the observation that some components of the composition are soluble in the solvent while other components are insoluble in the solvent. For example, a wood substitute composition of the invention is "partially soluble" in boiling xylene at 1 atmosphere pressure since polymeric components of the wood substitute composition are soluble in the xylene, while other components, such as calcium carbonate, are not soluble.

The present invention may be better understood by reference to the following non-limiting Example, which is provided as exemplary of the invention. The following example is presented in order to more fully illustrate the preferred embodiments of the invention. It should in no way be construed, however, as limiting the broad scope of the invention.

EXAMPLE

Engineering of products with multi-cycle life considerations is increasingly put into practice.[1] Plastics products are among the most important consumer goods that should be engineered with recycling/reuse issues in mind, owing to their large scale use and economic or technological difficulties in recycling. Carpets and carpet backing constitute some of the highest volume plastics products that need to be recycled. The quantities of carpets available for recycling have been estimated as follows (in million metric tons):

954 in the year 1990;

1045 in the year 1995;

1135 in the year 2000; and 1365 in the year 2010.[2]

Carpets consist of mainly nylon 6 or nylon 66 fibers with a backing comprising polypropylene (PP), styrene butadiene rubber (SBR), and calcium carbonate. A patent[3] and related article[4] describe a process in which carpets are shredded and fed into a reactor at high temperature and pressure. Nylon 6 is converted to caprolactam monomer and the backing material is obtained as a residue. Heretofore, this residue has been considered to have a negative value, since it is mainly land filled at this point.

Disclosed herein are wood substitute compositions made by blending a polyolefin with this carpet backing residue, which has many applications, particularly in the construction field. More specifically, prototypes were made to use the wood substitute composition of the invention in a novel application as a thermal spacer in a plastic webbed steel stud.

Experimental

Materials

Carpet residue was obtained from Allied-Signal, and is referred to by Allied-Signal as Q compound. The appearance of Q compound is dark colored, brittle flakes. It contains about 63–65% calcium carbonate, about 15–18% polypropylene, and about 12–15% styrene butadiene rubber by weight. Thermogravimetric analysis indicated Q compound has a thermal stability up to 300° C. The physical and chemical properties of Q compound are set forth in Table 1 above, and in the Material Safety Data Sheet attached hereto as Appendix A. The polyolefin used in this example of a wood substitute composition of the invention was low density polyethylene (LDPE), grade LD506 from Exxon Chemicals. However, any polyolefin available to one of ordinary skill in the art can be used in a wood substitute composition of the invention. Particular examples are set forth above.

Processing

1. Batch Mixing and Compression Molding

For an initial evaluation of the mechanical properties, compositions of the invention were prepared by batch mixing followed by compression molding. The Q compound was first ground, washed and dried. It was then mixed with LDPE in a Brabender batch mixer at 60 rpm and 120° C. for 5 minutes. Up to 90% by weight of Q product could be incorporated in the polyethylene. giving the composition produced an overall calcium carbonate content of 50%–52% by weight. The pellets obtained were then compression molded into bars for tensile testing.

2. Extrusion Compounding/Devolatilization of the Q Compound and LDPE

In the batch mixing experiments, it was noticed that the Q compound had an unpleasant odor. In order to remove the odor and any potential volatiles, the Q compound and the LDPE were compounded and simultaneously devolatilized using a 34 mm diameter 32 L/D co-rotating twin screw extruder, manufactured by the American Leistriz Company. The machine was equipped with eight segmented barrels with individual heating and cooling control except for the first barrel segment, which was water cooled. The screw was arranged with proper conveying, kneading and melt sealing elements for simultaneous compounding and devolatilization operation. A 3.2 mm rod die, mounted on the die holder, was used at the end of the extruder. The temperature of the die holder was controlled by a temperature controller. The melt temperature and the melt pressure were measured at the die holder.

A dry blend of LDPE and Q compound at a weight ratio of 20:80 was prepared and metered into the throat of the extruder in the first zone using a K-Tron twin screw volumetric solid metering feeder. Mixing was achieved in the next four zones. Vacuum was applied on the sixth zone. The last two zones were used to achieve conveying and pressurization of the melt compound. The extruded rod was collected under water and was ground and dried for future processing. Operating conditions are set forth in Table 2.

3. "Intrusion" Molding of Thermal Spacer Prototypes

The pellets prepared by compounding/devolatilization were "intrusion" molded into prototypes which were basically rectangular blocks with dimensions of 203×63×12.7 mm. The intrusion molding process is similar to the one developed in the 1970's. It basically consists of intermittent extrusion and cavity filling. Once the cavity is filled, the pressure rises rapidly and the cavity is packed. The extrusion into the cavity is stopped at this point and the mold is cooled and opened. Typical operating conditions were as follows: Extruder barrel segment temperatures: 150° C., 205° C. and 232° C., giving a melt temperature of about 225° C. The density of the wood substitute composition produced was 1.35–1.4 g/cm$^3$.

Characterization

1. Leaching Characteristics of Prototypes

The prototype blocks prepared by compound/devolatilization/"intrusion" molding were tested for leaching of heavy metals and total organic carbon (TOC) content. For leaching of heavy metals, the prototypes were extracted with 500 ml of buffer solution adjusted for pH of 4 at 50° C. for 24 hours. Heavy metal analysis of the leachate was carried out using a graphite furnace atomic adsorption spectroscopy, model Smith-Hieftje 12. For leaching of organic carbon, pH of 10 was used. Extraction solutions were analyzed by O-I-analytical, Model 700 Total Organic Carbon (TOC) analyzer. For comparison, a thermal spacer made out of virgin LDPE and a paint coated metal prototype block were also tested. In order to compare the effectiveness of compounding/devolatilization step, 50 grams of as received Q compound were tested using the same procedure.

2. Mechanical Properties

Short term tensile and flexural testing was conducted on compression molded and "intrusion" molded bars respectively. Three point bending flexural creep experiments were performed on samples cut to dimensions of 203×63×2.7 mm using a span length of 101.6 mm. 454 grams of load were used corresponding to a flexural stress of 0.33 mPa. Wood and LDPE blocks were also tested for comparison.

3. Thermal and Microscopic Evaluation

Flammability was measured on prototypes machined to dimensions of 12.7×12.7×127 mm according to ASTM D-635 and D-4804, which are hereby incorporated by reference. The specimens were marked at 25 cm and 100 cm from one end, and mounted horizontally on an iron stand. The experiment was started by subjecting the end of the specimen with a blue flame for 30 seconds. The time interval for the propagation of the flame from the 25-cm marker to the 100-cm marker was recorded.

Thermal conductivity measurements were done on disks with dimensions of 5.08 mm diameter×3.2 mm thickness at room temperature.

Samples were cryo-microtomed and stained with OsO$_4$ for scanning electron microscopy.

Results and Discussion

1. Tensile and Flexural Properties

Flexural testing results obtained on "intrusion" molded wood substitute composition blocks are summarized in Table 3. For LDPE, the stress at 5% was recorded, since these samples did not break in flexural testing. It was observed that Q compound increases the rigidity of polyethylene due to its rigid calcium carbonate content. However, the strain at break is reduced. Tensile testing produced similar trends.

2. Compounding, Devolatilization and Intrusion Molding

Conditions such as 9 kg/hr feed rate and 200 rpm screw speed were found to be optimum for compounding/devolatilization in this extruder. Increasing the feed rate above 9 kg/hr resulted in flooding of the vacuum port. At higher rpm, vacuum was found to leak through the hopper. At lower rpm, the vacuum port was clogged with the melt. The extrudate was continuous but had very little melt strength; after water cooling it was found to be very brittle. No significant problems were encountered during the compounding except for the unpleasant odor.

3. Leaching Characteristics of Prototypes

Table 4 shows the leachable heavy metals from Q compound and a wood substitute composition prototype of the invention, produced using processes of the invention. 50 grams of ground flakes of Q Compound were used and the blocks weighed approximately 218 grams. The leachable material content is shown after normalizing by the weight of the samples used. It is observed that all of the heavy metals are reduced over 97.6% by the compounding/devolatilization and molding procedure. Table 5 shows the leachable material content from various prototypes including a block of a wood substitute composition of the invention, a paint coated metal block, and a block of virgin LDPE, each block having the same dimensions. These data are not normalized by weight, since the densities of these materials are significantly different. It can be seen that after the compounding/devolatilization/molding process, leachable heavy metal content is reduced to a level one of ordinary skill in art would expect from virgin LDPE or paint coated metal. Table 6 shows the total leachable organic carbon (TOC) content from LDPE and wood substitute composition prototypes as well as Q compound. The weights of the blocks are indicated. The TOC is normalized by the quantity of the polyolefin in the samples. By comparing the TOC for the two prototypes, it can be seen that the block of wood substitute composition has twice the TOC of virgin LDPE. Comparison of TOC of the Q compound and the wood substitute composition prototype block indicates that more than 98% of the TOC is reduced with the compounding/devolatilization/molding procedure used in the production of the wood substitute composition.

4. Creep Properties

Figure 2:
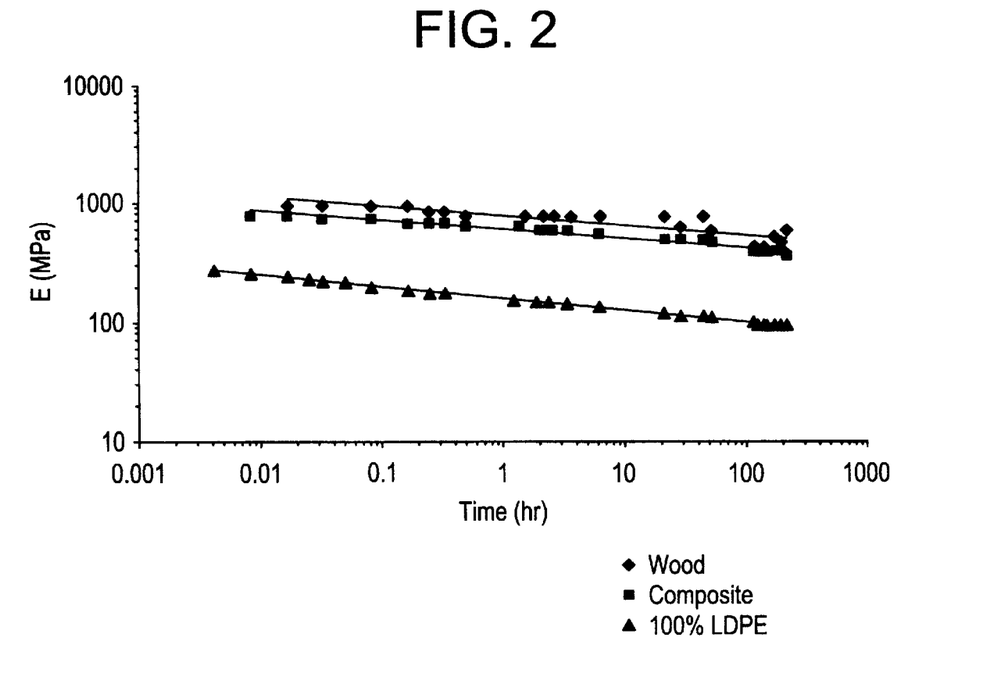
FIG. 2 is a graph of creep modulus vs. time data for wood, a wood substitute composition of the invention comprising by weight about 80% Q compound and about 20% low density polyethylene (LDPE), and virgin low density polyethylene.

Creep properties involve the measurement of the gradual deformation of a material due to constant stress, high temperature, etc. The creep modulus vs. time data are plotted in FIG. 2. It can be seen that wood, the wood substitute composition of the invention, and LDPE have a similar fractional decrease in the creep modulus with respect to time. The slopes of the lines in FIG. 2 are −0.083, −0.0747 and −0.0953 for wood, wood substitute composition, and LDPE, respectively. However, the absolute value of the creep modulus is approximately 30% higher than for wood than it is for the wood substitute composition, and much higher than that of LDPE. For applications in which creep modulus value is critical, the amount of creep can be readily controlled by a skilled artisan simply by adjusting the product dimensions, and the ratio of Q compound to polyolefin used in the production of a wood substitute composition of the invention.

5. Thermal and Microscopic Evaluation

In this horizontal mode of burning, the wood specimen could not sustain the flame all the way after ignition. It only charred the outer surface of the specimen and the rate of flame propagation was about 0.52 cm/min while it was burning. In LDPE, the flame propagation rate was 0.75 cm/min. The molten LDPE dripped and burning was completed. A wood substitute composition of the invention, comprising about 20% LDPE and about 80% Q compound burned at a rate of 0.577 cm/min, which one of ordinary skill in the would acknowledge is quite comparable to the initial flame propagation of wood. During testing, the burned wood substitute composition specimen segregated due to gravity and continued burning on the supporting wire screen. Although under no obligation to explain the thermal properties of a wood substitute composition of the invention, and certainly not intended to be bound by any explanation or hypothesis, it is possible that calcium carbonate has a positive effect on the burning of a wood substitute composition of the invention in that it retards flame propagation in the wood substitute composition.

The thermal conductivity of LDPE and the wood substitute composition were found to be $2.36 \times 10^{-4}$ and $2.92 \times 10^{-4}$ cal/(s.cm.K) respectively. For softwood, a value of $2.8 \times 10^{-4}$ was calculated using the values reported in the literature. The results indicate that thermal conductivity of a wood substitute composition of the invention is comparable to that of softwood. As a result, a wood substitute composition can readily be used in place of wood in numerous construction applications, and particularly as thermal spacers in plastic webbed steel studs.

Figure 5:
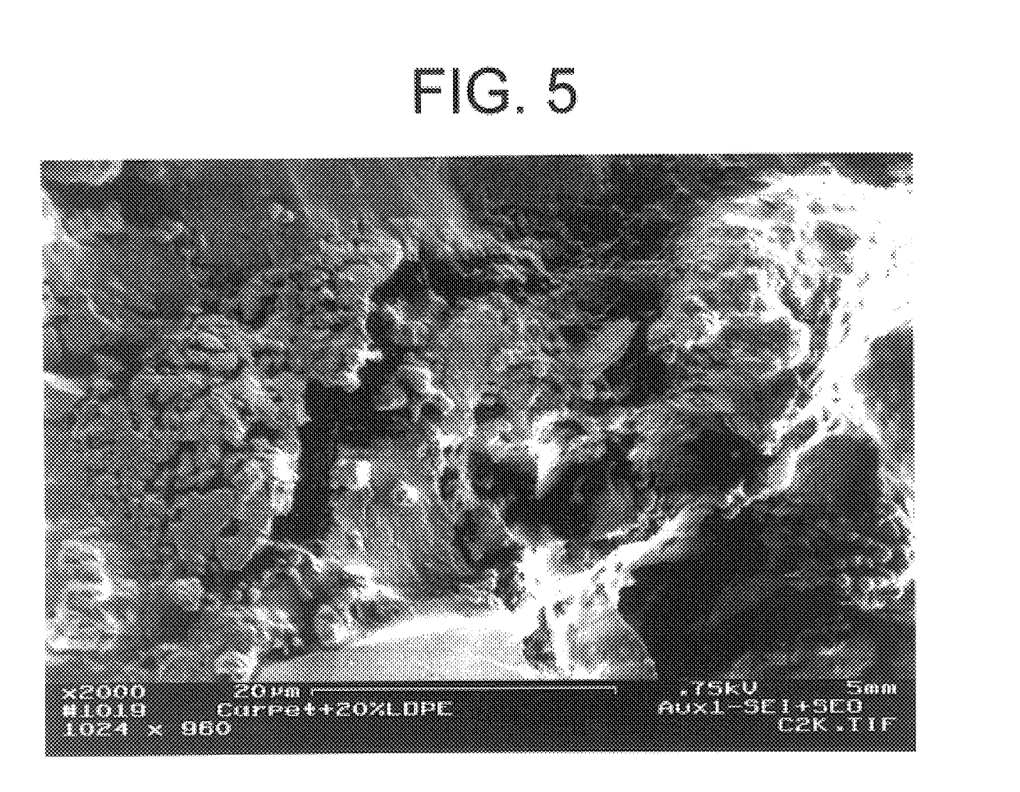
FIG. 5 is scanning electron micrograph of a wood substitute composition of the invention comprising about 80% by weight Q Compound, and about 20% by weight low density polyethylene.

FIG. 5 shows a Scanning electron micrograph of cryo-microtomed block of a wood substitute composition of the invention comprising about 20% by weight LDPE and about 80% by weight Q compound. The complex structure shows embedded calcium carbonate particles as well as domains of immiscible polymer components.

Furthermore, FIG. 3 is a graph of the melting point range of a wood substitute composition of the invention comprising about 20% by weight LDPE and about 80% by weight Q compound, and FIG. 4 is its infrared (IR) spectrum. The melting point range was determined by differential scanning calorimetry in a Perkin-Elmer DSC7 by heating at 20° C./min. The wood substitute composition exhibited three peaks; one at 110.7° C. attributed to polyethylene and peaks at 155.5° C. and about 164° C. The IR spectrum involved the use of a thin film of the wood substitute composition produced by compression molding, which was scanned on a Perkin-Elmer 983 spectrophotometer.

CONCLUSIONS

Up to 90% by weight of Q compound can be incorporated into a polyolefin to produce a wood substitute composition of the invention. Naturally, a wood substitute composition of the invention can be used in numerous building and construction applications. Addition of Q compound decreases the strength and strain at break of a wood substitute composition of the invention, but increases the modulus of LDPE in tensile and flexural loading. Prototype blocks of a wood substitute composition of the invention can be made in numerous means, and a particular example involves compounding/devolatilization followed by intrusion molding. The leachable volatile organic matter content and heavy metals are significantly reduced through the devolatilization/compounding/process. The prototypes produced have creep and thermal conductivity values that are comparable to that of wood, making wood substitute compositions of the invention readily suitable for building and construction applications.

TABLE 2

Operating conditions in Compounding/Devolatilization of Q compound with LDPE

| Barrel Zone Temp. Settings (° C.) | | | | | | Die Temp. | Melt Conditions | | |
|---|---|---|---|---|---|---|---|---|---|
| | | | | | | | Pressure (M Pa) | Flow rate (kg/hr) | RPM |
| 2 | 3 | 4 | 5 | 6 | 7 | | | | |
| 150 | 150 | 150 | 150 | 150 | 150 | 180 | 3.5 | 44 | 200 |

TABLE 3

Flexural Properties of Thermal Spacers prototypes made of a Wood Substitute Composition of the Invention

| Material | Strength (M Pa) | Modulus (M Pa) | Stress at 5% Strain (M Pa | Strain at Break (%) |
|---|---|---|---|---|
| LDPE | No Break | 0.640 | 7.8 | No Break |
| WSC* | 15.0 | 1.482 | — | 1.4 |

*Wood substitute composition.

TABLE 4

Extraction of Heavy Metals from Q Compound and Prototypes of wood substitute composition containing 80% by weight Q compound

| Element | Leachable from Q compound ($\mu g/g$) | Leachable from Prototypes ($\mu g/g$) × $10^3$ | % Reduction by Devolatilization and Molding |
|---|---|---|---|
| Cd | 0.080 | 1.28 | 98.4 |
| Pb | 0.33 | 0.55 | 99.8 |
| Cr | 0.048 | 1.15 | 97.6 |
| Ni | 0.45 | 0.55 | 99.9 |
| Mn | 0.81 | 1.10 | 98.6 |

TABLE 5

Extraction of Heavy metals from Various Prototype Blocks (203 × 63 × 12.7 mm)

| Element | Composite Prototype (Total $\mu g$) | Paint coated Metal Prototype (Total $\mu g$) | LDPE Prototype (Total $\mu g$) |
|---|---|---|---|
| Cd | 0.28 | 0.05 | 0.09 |
| Pb | 0.12 | 2.94 | 0.32 |
| Cr | 0.25 | 0.07 | 0.21 |
| Ni | 0.82 | 1.00 | 3.54 |
| Mn | 2.4 | 0.48 | 0.65 |

TABLE 6

Total Leachable Organic Carbon (TOC) from Prototype Blocks and Q Compound

| Sample | Dry Weight (g) | Polymer Content (% by weight) | Total TOC ($\mu g/g$ of polymer) |
|---|---|---|---|
| LDPE Prototype | 142.9 | 0.00 | 0.038 |
| Composite Prototype | 213.4 | 49 | 0.097 |
| Q Compound | 50.0 | 36 | 8.75 |

The present invention is not to be limited in scope by the specific embodiments describe herein. Indeed, various modifications of the invention in addition to those described herein will become apparent to those skilled in the art from the foregoing description and the accompanying figures. Such modifications are intended to fall within the scope of the appended claims.

References

1. K. A. Narh, M. Xanthos, Z. li, S. K. Dey, U. Yilmazer and Y. Li, *Simulation of the Intrusion Process for Thick Walled Thermoplastics—Product and Process Characteristics*. 56th SPE ANTEC Proceedings, 1767 (1998).
2. A. L. Bisio and M. Xanthos, *How to Manage Plastics Waste*, Carl Hanser, Verlag, New York (1994) pp. 83–90
3. S. Sifniades, A. B. Levy and J. A. J. Hendrix, U.S. Pat. No. 5,681,952 (1997).
4. A. B. Levy and S. Sifniades, *Post Consumer Carpet Recycling at Allied Signal*. Paper Presented at Arc'97, November (1997).
5. Reference 2, pp. 84–85.

Various publications are cited herein, the disclosures of which are incorporated by reference in their entireties.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended Claims.

What is claimed is:

1. A wood substitute composition prepared by the process of;
    a) mixing a polyolefin and Q compound, said Q compound being a by-product of carpet recycling comprising calcium carbonate, polypropylene and styrene butadiene rubber;
    b) heating the mixture to a sufficient temperature for sufficient length of time to form a fluid; and
    c) cooling the fluid to form a solid.

2. The wood substitute composition of claim 1, wherein said polyolefin comprises about 10% to about 90% by weight of said wood substitute composition, and said composition comprises about 10% to about 90% by weight of said wood substitute composition.

3. The wood substitute composition of claim 1, wherein said polyolefin and said composition are mixed and heated to a sufficient temperature for a sufficient length of time to form a fluid, which is then cooled to form a solid.

4. The wood substitute composition of claim 3, wherein said sufficient temperature ranges from about 100° C. to about 230° C.

5. The wood substitute composition of claim 4, wherein said sufficient temperature is about 225° C.

6. The wood substitute composition of claim 3, wherein said sufficient length of time ranges from about 3 minutes to about 10 minutes.

7. The wood substitute composition of claim 6, wherein said sufficient length of time is about 5 minutes.

8. The wood substitute composition of claim 3, wherein said polyolefin and said composition are heated and mixed simultaneously.

9. The wood substitute composition of claim 1, wherein the polyolefin comprises polyethylene, polypropylene, polybutene, polymethylpentene, a copolymer of a polyolefin, or a combination of a copolymer of a polyolefin and another molecule.

10. The wood substitute composition of claim 9, wherein said copolymer of a polyolefin comprises a copolymer of polyethylene, a copolymer of polypropylene, a copolymer of polybutene or a copolymer of polymethylpentene.

11. The wood substitute composition of claim 9, wherein said combination of a copolymer of a polyolefin and another molecule comprises a copolymer of ethylene with an unsaturated acid selected from the group consisting of acrylic acid and methacrylic acid; a copolymer of propylene with an unsaturated acid selected from the group consisting of acrylic acid and methacrylic acid; a copolymer of ethylene with an unsaturated anhydride selected from the group consisting of acrylic anhydride, methacrylic anhydride and maleic anhydride; a copolymer of propylene with an unsaturated anhydride selected from the group consisting of acrylic anhydride, methacrylic anhydride, and maleic anhydride; or a copolymer of a polyolefin with styrene.

12. The wood substitute composition of claim 1, wherein said Q compound comprises 63–65% calcium carbonate, 15–18% polypropylene, and 12–15% styrene butadiene rubber.

13. The wood substitute composition of claim 12, wherein the percentage by weight of polyolefin in said wood substitute composition ranges from about 10% to about 90%, and the percentage by weight of Q Compound ranges from about 10% to about 90%.

14. The wood substitute composition of claim 13, wherein said polyolefin comprises polyethylene, polypropylene, polybutene, polymethylpentene, a copolymer of a polyolefin, or a combination of a copolymer of a polyolefin and another molecule.

15. The wood substitute composition of claim 14, wherein said copolymer of a polyolefin comprises a copolymer of polypropylene, a copolymer of polypropylene, a copolymer of polybutene or a copolymer of polymethylpentene.

16. The wood substitute composition of claim 14, wherein said combination of copolymer of a polyolefin and another molecule comprises a copolymer of ethylene with an unsaturated acid selected from the group consisting of acrylic acid and methacrylic acid; a copolymer of propylene with an unsaturated acid selected from the group consisting of acrylic acid and methacrylic acid; a copolymer of ethylene with an unsaturated anhydride selected from the group consisting of acrylic anhydride, methacrylic anhydride and maleic anhydride; a copolymer of propylene with an unsaturated anhydride selected from the group consisting of acrylic anhydride, methacrylic anhydride, and maleic anhydride; or a copolymer of a polyolefin with styrene.

17. The wood substitute composition of claim 14, wherein said polyolefin comprises low density polyethylene, and the percentage by weight of said low density polyethylene in said wood substitute composition is about 20%, and the percentage by weight of said Q compound in said wood substitute composition is about 80% by weight.

18. The wood substitute composition of claim 17, wherein said sufficient temperature ranges from about 100° C. to about 230° C.

19. The wood substitute composition of claim 18, wherein said sufficient temperature is about 225° C.

20. The wood substitute composition of claim 19, wherein said sufficient length of time is about 5 minutes.

21. The wood substitute composition of claim 20, wherein said wood substitute composition:

comprises a density of 1.35–1.4 g/cm$^3$;

comprises a thermal conductivity of 2.92×10$^{-4}$ cal/(s.cm.K);

comprises a flame propagation of about 0.52 cm/min;

is partially soluble in boiling xylene at 1 atmosphere;

is relatively insoluble in water;

comprises a melting point range as set forth in FIG. 3, wherein the melting point range comprises a peak at 110.7° C., a peak at 155.5° C., and a peak at about 164° C.; and comprises an infra red spectrum substantially as shown in FIG. 4.

22. A process for producing a wood substitute composition comprising the steps of:

i) mixing a polyolefin with Q compound, said Q compound being a by-product of carpet recycling comprising calcium carbonate, polypropylene and styrene butadiene rubber, ii) heating the mixture to a sufficient temperature for sufficient length of time to form a fluid; and iii) cooling the fluid to form a solid.

23. The process of claim 22, wherein the sufficient temperature ranges from about 100° C. to about 230° C.

24. The process of claim 22, wherein the sufficient length of time ranges from about 3 minutes to about 10 minutes.

25. The process of claim 22, wherein the mixing step and the heating step occur simultaneously.

26. The process of claim 22, wherein said polyolefin comprises polyethylene, polypropylene, polybutene, polymethylpentene, a copolymer of a polyolefin, or a combination of a copolymer of a polyolefin and another molecule.

27. The process of claim 26, wherein said copolymer of a polyolefin comprises a copolymer of polyethylene, a copolymer of polypropylene, a copolymer of polybutene or a copolymer of polymethylpentene.

28. The process of claim 26, wherein said combination of copolymer of a polyolefin and another molecule comprises a copolymer of ethylene with an unsaturated acid selected from the group consisting of acrylic acid and methacrylic acid; a copolymer of propylene with an unsaturated acid selected from the group consisting of acrylic acid and methacrylic acid; a copolymer of ethylene with an unsaturated anhydride selected from the group consisting of acrylic anhydride, methacrylic anhydride and maleic anhydride; a copolymer of propylene with an unsaturated anhydride selected from the group consisting of acrylic anhydride, methacrylic anhydride, and maleic anhydride; or a copolymer of a polyolefin with styrene.

29. The process of claim 26, wherein the polyolefin comprises low density polyethylene.

30. The process of claim 22 wherein said Q compound comprises 63–65% calcium carbonate, 15–18% polypropylene, and 12–15% styrene butadiene rubber.

31. The process of claim 22, wherein said Q compound comprises about 10% to about 90% by weight of the mixture, and the polyolefin comprises by weight about 10% to about 90% of the mixture.

32. The process of claim 31, wherein said Q compound comprises about 80% by weight of the mixture, and said polyolefin comprises about 20% by weight of the mixture.

33. The process of claim 32, wherein said polyolefin comprises polyethylene, polypropylene, polybutene, polymethylpentene, a copolymer of a polyolefin, or a combination of a copolymer of a polyolefin and another molecule.

34. The process of claim 33, wherein said copolymer of a polyolefin comprises a copolymer of polypropylene, a copolymer of polypropylene, a copolymer of polybutene or a copolymer of polymethylpentene.

35. The process of claim 33, wherein said combination of copolymer of a polyolefin and another molecule comprises a copolymer of ethylene with an unsaturated acid selected from the group consisting of acrylic acid and methacrylic acid; a copolymer of propylene with an unsaturated acid selected from the group consisting of acrylic acid and methacrylic acid; a copolymer of ethylene with an unsaturated anhydride selected from the group consisting of acrylic anhydride, methacrylic anhydride and maleic anhydride; a copolymer of propylene with an unsaturated anhydride selected from the group consisting of acrylic anhydride, methacrylic anhydride, and maleic anhydride; or a copolymer of a polyolefin with styrene.

36. The process of claim 33, wherein the polyolefin comprises low density polyethylene.

37. The process of claim 36, wherein the sufficient temperature to which the mixture is heated ranges from about 100° C. to about 230° C.

38. The process of claim 37, wherein the sufficient temperature is about 225° C., and the sufficient length of time is about 5 minutes.

39. The process of claim 38, wherein the wood substitute composition:

comprises a density of 1.35–1.4 g/cm$^3$;

comprises a thermal conductivity of 2.92×10$^{-4}$ cal/(s.cm.K);

comprises a flame propagation of about 0.52 cm/min is partially soluble in boiling xylene at 1 atmosphere pressure;

is relatively insoluble in water;

comprises a melting point range as set forth in FIG. 3, wherein the melting point range comprises a peak at 110.7° C., a peak at 155.5° C., and a peak at about 164° C.; and comprises an infra red spectrum substantially as shown in FIG. 4.

40. The process of claim 38, wherein the heating and mixing of the mixture occurs simultaneously.

41. The process of claim 40, wherein the wood substitute composition:

comprises a density of 1.35–1.4 g/cm$^3$;

comprises a thermal conductivity of 2.92×10$^{-4}$ cal/(s.cm.K);

comprises a flame propagation of about 0.52 cm/min is partially soluble in boiling xylene at 1 atmosphere pressure;

is relatively insoluble in water;

comprises a melting point range as set forth in FIG. 3, wherein the melting point range comprises a peak at 110.7° C., a peak at 155.5° C., and a peak at about 164° C.; and comprises an infra red spectrum substantially as shown in FIG. 4.

* * * * *